W. K. LEWIS.
BEET PULLING MACHINE.
APPLICATION FILED JULY 15, 1916.
1,235,903.
Patented Aug. 7, 1917.
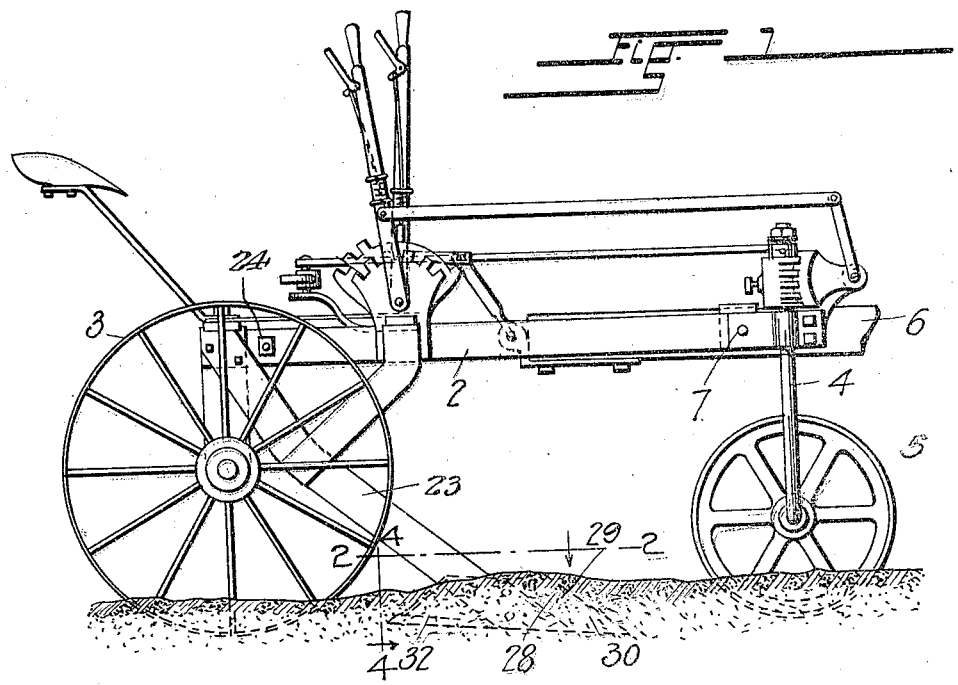
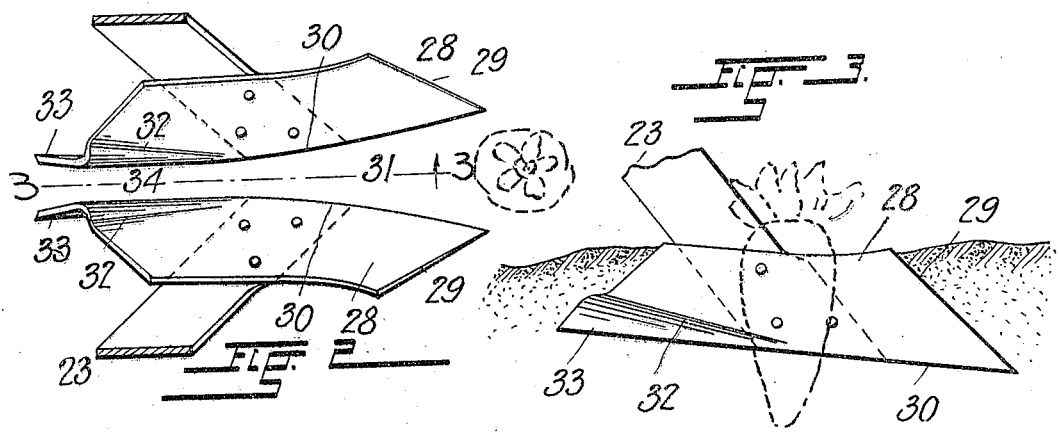
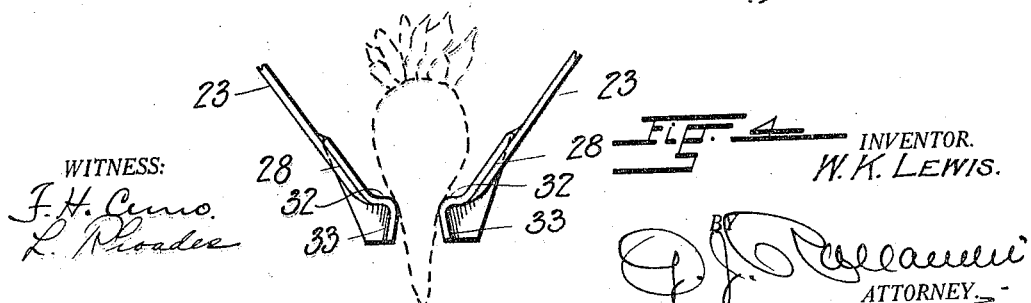
WITNESS:
F. H. Cuno
L. Rhoades
INVENTOR.
W. K. Lewis.
ATTORNEY.

UNITED STATES PATENT OFFICE.

WILLIAM K. LEWIS, OF DENVER, COLORADO.

BEET-PULLING MACHINE.

1,235,903.  Specification of Letters Patent.  Patented Aug. 7, 1917.

Application filed July 15, 1916. Serial No. 109,472.

*To all whom it may concern:*

Be it known that I, WILLIAM K. LEWIS, a citizen of the United States, residing at Denver, in the county of Denver and State of Colorado, have invented certain new and useful Improvements in Beet-Pulling Machines, of which the following is a specification.

This invention relates to improvements in beet-pulling machines, and its object resides in providing in a machine of this character, a beet-digging element of novel construction which in the operation, lifts and deposits the beet roots, irrespective of their longitudinal or circumferential dimensions, and without cutting or otherwise injuring them.

My improved beet lifting element is furthermore advantageous over other implements of the same type in that in the operation of digging the beets, it cuts a core through the soil instead of throwing it, and thus leaves the ground in proper condition for further cultivation.

An embodiment of my invention is illustrated in the accompanying drawings, in the various views of which like parts are similarly designated and in which, Figure 1 is a side view of a beet-pulling machine equipped with my improved beet-lifting element, Fig. 2, an enlarged section taken along the line 2—2, Fig. 1, Fig. 3, a side elevation of one of the members of the beet-lifting element, looking in the direction of the arrow drawn across the line 3—3, Fig. 2, and Fig. 4, a rear elevation of the beet-lifting element looking in the direction of the arrow placed across the line 4—4, Fig. 1, drawn to an enlarged scale.

Referring to the drawings by numerical reference characters, 2 designates the frame of the beet-pulling machine to which my invention is applied, which at its rear end is supported upon wheels 3 and which at its opposite end is slidingly held in connection with rotary vertical standards 4 upon which the front wheels 5 are journaled.

The frame is pivotally connected with a tongue 6 as at 7, and it is provided with an adjustment for raising its front end to elevate the front wheels and the beet-lifting element above the surface of the ground in turning corners or transporting the machine from place to place, and with an adjustment for regulating the depth at which the beet-lifting element moves through the soil in the operation of the machine.

The frame of the beet-pulling machine comprises a pair of parallel side-bars at the rear ends of which are mounted forwardly and downwardly extending convergent arms 23 to which the beet-lifting element is attached. A bolt 24 extending through openings in the side bars of the frame, serves to draw them together and thereby reduce the distance between the members of the element at the ends of the arms 23, it being understood that the connections of the side bars of the frame are sufficiently resilient to permit of their adjustment to a limited extent.

The element which in the operation of the machine, lifts the beet roots and deposits them upon the surface of the ground, consists of two blades 28 placed a slight distance apart at the ends of the arms 23 which connect with the frame.

The arms are relatively arranged to place the blades in a longitudinally and downwardly convergent position with their lower edges spaced from each other, as shown in Fig. 4, and the blades are fastened to the arms in a forwardly slanting position as illustrated in Fig. 3.

Each blade has at its forward end a slanting cutting edge 29 which terminates in a point at its intersection with the bottom edge 30 of the same.

The forward portions of the two blades comprised in the beet-lifting element, may curve laterally to further widen the gradually narrowing passage 31 for the beet roots, provided by the longitudinal convergence of the blades, and their rearward portions extend in substantially parallel relation to each other and are provided adjacent their lower edges with inwardly projecting, longitudinally extending and slightly tapering ridges 32 which are rounded in cross section and terminate in outwardly flaring wings 33.

In the operation of the beet puller machine, it is driven along a field to be harvested, with its wheels traveling through the ditches at opposite sides of a beet row, and with its beet lifting element extending in the soil between said ditches.

During forward movement of the machine, the blades extend at opposite sides of the row of beets and gradually engage the beet-roots as they enter the space 31 between their forward convergent, curving and laterally convergent portions.

The beets are by engagement with the inner surfaces of the blades, lifted gradually out of the ground until they enter the narrow passage 34 confined by their rounded ridges 32 when they are pushed suddenly upwardly and deposited upon the surface of the ground.

The outwardly flaring wings 33 which are continuous with the ridges, remove dirt and other adherent matter from the beet roots and positively prevent their being cut or otherwise injured.

In this respect my improved beet lifting element is of very great advantage over other devices of like character, which in their operation injure the roots and frequently sever the beets of smaller dimensions in two parts instead of lifting them out of the ground.

Having thus described my invention what I claim and desire to secure by Letters-Patent is:

1. In a beet pulling machine, a beet-lifting element comprising two downwardly convergent blades spaced at their lower edges and having slanting cutting-edges at their forward ends, the rearward portions of the blades having inwardly projecting, longitudinally extending ridges of rounded section terminating in outwardly flaring wings.

2. In a beet pulling machine, a beet-lifting element comprising two downwardy convergent blades spaced at their lower edges, the rearward portions of the blades having inwardly projecting, longitudinally extending ridges of rounded section terminating in outwardly flaring wings.

3. In a beet-pulling machine, a beet-lifting element comprising two downwardly convergent blades spaced at their lower edges, the forward portions of the blades curving outwardly to provide a gradually narrowing entrance for the beet-roots and the rearward portions of the same having inwardly projecting longitudinally extending ridges of rounded section.

4. In a beet-pulling machine, a beet-lifting element comprising two downwardly convergent blades the lower edges of which are spaced and slant forwardly, the rearward portions of the blades having inwardly projecting longitudinally extending ridges of rounded section terminating in outwardly flaring wings.

5. In a beet-pulling machine, a beet lifting element comprising two downwardly convergent blades the lower edges of which are spaced and slant forwardly, and the forward edges of which slant rearwardly at an acute angle to said lower edges, the forward portions of the blades curving outwardly to provide a gradually narrowing entrance for the beet-roots and the rearward portions of the same having inwardly projecting longitudinally extending ridges of rounded section.

6. In a beet pulling machine, a beet-lifting element comprising two downwardly convergent blades, the lower edges of which are spaced and slant forwardly, and the forward edges of which slant rearwardly at an acute angle to said lower edges, the rearward portions of the blades having inwardly projecting longitudinally extending ridges of rounded section terminating in outwardly flaring wings.

7. As a new article of manufacture, a beet-lifting device for beet-pulling machines comprising a blade having a laterally curving forward portion, and provided at its rearward portion with a longitudinally and inwardly extending ridge of rounded section terminating in an outwardly flaring wing.

8. As a new article of manufacture, a beet-lifting device for beet-pulling machines comprising a blade having a laterally curving forward portion and a slanting cutting edge at the forward end thereof, and provided at its rearward portion with a longitudinally and inwardly extending ridge of rounded section terminating in an outwardly flaring wing.

9. As a new article of manufacture, a beet-lifting device for beet-pulling machines comprising a blade having a laterally curving forward portion, and provided at its rearward portion with a longitudinally and inwardly extending ridge of rounded section.

10. In a beet-pulling machine, a beet-lifting element comprising two downwardly convergent blades spaced at their lower edges and having slanting cutting edges at their forward ends, the forward portions of the blades curving outwardly to provide a gradually narrowing entrance for the beet-roots and the rearward portions of the same having inwardly projecting longitudinally extending, and substantially parallel ridges of rounded section terminating in outwardly flaring wings.

11. In a beet-pulling machine, a beet-lifting element comprising two spaced blades the inner surfaces of which converge downwardly, said blades having cutting-edges at their forward ends, and inwardly projecting, longitudinally extending ridges of rounded section at their rearward ends.

12. In a beet-pulling machine, a beet-lifting element comprising two spaced blades the inner surfaces of which converge downwardly, said blades having cutting-edges at their forward ends, and substantially parallel inwardly projecting, longitudinally extending ridges of rounded section at their rearward ends.

13. In a beet-pulling machine, a beet-lifting element comprising two spaced blades the inner surfaces of which converge downwardly, said blades having cutting-edges at their forward ends, and inwardly projecting, longitudinally extending ridges of rounded section terminating in outwardly flaring wings, at their rearward ends.

14. In a beet-pulling machine, a beet-lifting element comprising two spaced blades the inner surfaces of which converge downwardly, said blades having cutting-edges at their forward ends, and inwardly projecting, longitudinally extending and upwardly slanting ridges of rounded section at their rearward ends.

15. In a beet-pulling machine, a beet-lifting element comprising two blades the inner surfaces of which converge downwardly, and the lower edges of which are spaced and slant forwardly, said blades having cutting-edges at their forward ends and inwardly projecting, longitudinally extending ridges of rounded section at their rearward ends.

16. As a new article of manufacture, a beet-lifting device for beet-pulling machines comprising a blade having a cutting edge at its forward end and a longitudinally and inwardly extending ridge of rounded section at its rearward end.

17. As a new article of manufacture, a beet-lifting device for beet-pulling machines comprising a blade having a cutting-edge at its forward end and a longitudinally and inwardly extending ridge of rounded section terminating in an outwardly flaring wing at its rearward end.

18. As a new article of manufacture, a beet-lifting device for beet-pulling machines comprising a blade having a cutting-edge at its forward end and a longitudinally and inwardly extending, upwardly slanting ridge of rounded section at its rearward end.

In testimony whereof I have affixed my signature in presence of two witnesses.

WILLIAM K. LEWIS.

Witnesses:
G. J. ROLLANDET,
L. RHOADES.

Copies of this patent may be obtained for five cents each, by addressing the "Commissioner of Patents. Washington, D. C."